(12) United States Patent
Kobayashi et al.

(10) Patent No.: US 10,977,146 B2
(45) Date of Patent: Apr. 13, 2021

(54) APPLICATION OPERATION MONITORING APPARATUS AND APPLICATION OPERATION MONITORING METHOD

(71) Applicant: HITACHI, LTD., Tokyo (JP)

(72) Inventors: Emiko Kobayashi, Tokyo (JP); Jun Mizuno, Tokyo (JP); Takashi Tameshige, Tokyo (JP); Nobuhiro Maki, Tokyo (JP); Junji Kinoshita, Tokyo (JP)

(73) Assignee: HITACHI, LTD., Tokyo (JP)

( * ) Notice: Subject to any disclaimer, the term of this patent is extended or adjusted under 35 U.S.C. 154(b) by 352 days.

(21) Appl. No.: 15/905,235

(22) Filed: Feb. 26, 2018

(65) Prior Publication Data
US 2019/0065334 A1    Feb. 28, 2019

(30) Foreign Application Priority Data

Aug. 31, 2017  (JP) .............................. JP2017-166485

(51) Int. Cl.
*G06F 11/30* (2006.01)
*G06F 9/54* (2006.01)
*G06F 11/34* (2006.01)

(52) U.S. Cl.
CPC ............ *G06F 11/3055* (2013.01); *G06F 9/54* (2013.01); *G06F 11/302* (2013.01); *G06F 11/3466* (2013.01); *G06F 2201/865* (2013.01)

(58) Field of Classification Search
CPC .. G06F 21/53; G06F 11/3466; G06F 11/3664; G06F 21/552; G06F 21/50; G06F 11/3409; G06F 16/285; G06F 2201/87; G06F 2201/875; G06F 11/3668; G06F 2009/45591; G06F 11/3065; G06F 2201/865; G06F 11/1484; H04L 67/42; H04L 41/046; H04L 67/22; H04L 43/00; H04L 43/12; H04L 51/046; H04L 41/0273; H04L 43/16; H04L 67/1097; H04L 43/08; H04L 63/1408
See application file for complete search history.

(56) References Cited

U.S. PATENT DOCUMENTS

| | | | | |
|---|---|---|---|---|
| 7,457,870 B1* | 11/2008 | Lownsbrough | ..... | H04L 41/5058 709/217 |
| 8,332,823 B2* | 12/2012 | Yamamoto | ............ | G06F 21/105 713/156 |
| 2006/0236114 A1* | 10/2006 | Yamamoto | ............ | G06F 21/105 713/176 |
| 2009/0313699 A1* | 12/2009 | Jang | ........................ | G06F 21/52 726/23 |

(Continued)

FOREIGN PATENT DOCUMENTS

| JP | 2005-208749 A | 8/2005 |
|---|---|---|
| JP | 2005208749 | * 8/2005 |

*Primary Examiner* — Jason D Recek
*Assistant Examiner* — Ranjan Pant
(74) *Attorney, Agent, or Firm* — Volpe Koenig

(57) ABSTRACT

By selecting, as a monitoring API, an API which does not involve modifying information when executing a request, from APIs called by an AP to be monitored, transmitting a pseudo-request to the monitoring API, and receiving a response to the request, a monitoring node for determining whether or not the monitoring API is operating normally is created and is included in the AP.

8 Claims, 13 Drawing Sheets

(56) References Cited

U.S. PATENT DOCUMENTS

| | | | |
|---|---|---|---|
| 2014/0129942 A1* | 5/2014 | Rathod | H04N 21/44222 715/720 |
| 2016/0057107 A1* | 2/2016 | Call | H04L 63/0236 726/11 |
| 2016/0080229 A1* | 3/2016 | Kobayashi | H04L 43/04 709/224 |
| 2016/0328222 A1* | 11/2016 | Arumugam | G06F 8/60 |
| 2017/0171049 A1* | 6/2017 | Kriegesmann | H04L 47/70 |
| 2018/0341256 A1* | 11/2018 | Hirahatake | G05B 23/0289 |

* cited by examiner

FIG. 6

| AP ID | Node ID | API |
|---|---|---|
| AP-1 | Node 1 | http://xxx/aaa/all query= q1 ,GET ... |
| | | http://xxx/bbb/list query= q2 ,GET ... |
| | | https://yyy/fff/login query= q3 ,GET ... |
| | Node 2 | http://xxx/ccc/update ,PUT ... |
| | | http://xxx/bbb/list query= q2 ,GET ... |
| | ... | |

801 → AP ID
802 → Node ID
803 → API

FIG. 13

| AP ID | Node ID | API | State |
|---|---|---|---|
| AP-1 | Node 1 | http://xxx/aaa/all query= q1 ,GET ... | Normal |
| | | http://xxx/bbb/list query= q2 ,GET ... | Normal |
| | | https://yyy/fff/login query= q3 ,GET ... | Normal |
| | Node 2 | http://xxx/ccc/update ,PUT ... | Normal |
| | | http://xxx/bbb/list query= q2 ,GET ... | Abnormal |
| | ... | | |

1301 — AP ID
1302 — Node ID
1303 — API
1304 — State

APPLICATION OPERATION MONITORING APPARATUS AND APPLICATION OPERATION MONITORING METHOD

BACKGROUND

The present invention relates to an application operation monitoring apparatus and an application operation monitoring method for monitoring an operational state of an application program.

A mechanism is known which enables software incorporating necessary functions and data to be readily developed by including an interface for providing functions and data in certain software while enabling other software to be provided with desired functions and data using the interface of the certain software. Software which has an interface and which provides functions and data in this manner is referred to as a service.

In addition, visual programming languages which enable programming to be performed using a combination of visual functional objects are known as software development environments. A developer can create, edit, register, and use a functional object that provides a prescribed function and can develop an application program by associating desired functional objects with each other to visually define data input and output. A functional object may be provided to perform a process of calling an interface of the service described above.

When a developed application program (hereinafter, referred to as an AP) becomes operational, an operational state thereof is desirably monitored to ensure that normal operation continues. Methods of monitoring an operational state of an AP includes a method disclosed in Japanese Patent Application Laid-open No. 2005-208749 in which a monitoring server issues a pseudo-request to each Web service sequentially performed in an application and an operation of a Web service is monitored by confirming a response to the pseudo-request.

SUMMARY

It is conceivable that an AP sequentially uses one or more functional objects (for example, in an order of an object 1, an object 2, and an object 3), and that each functional object is configured so that a plurality of services are used by calling an interface provided by the services. In such a configuration, when a normal response is not returned from a service that is a call destination in an intermediate functional object 2, the AP must retry from a functional object 1, which is the first functional object, thereby creating wasteful processing time, billing, and the like with respect to the functional object 1.

Therefore, when there is a service not operating normally among the services used by the AP, it is desirable to wait until all of the services operate normally. In order to do so, whether or not a service used by the AP is usable under conditions of use of the service by the AP is desirably checked upon start of operation of the AP.

Note that functional objects and services do not necessary correspond to each other one-to-one. A plurality of application programming interfaces (hereinafter, referred to APIs) called by one functional object may possibly be provided by mutually different services. In addition, mutually different functional objects may possibly call an API of a same service. Therefore, when creating an AP using a large number of functional objects, assessing a state of a service used by the AP is difficult. Furthermore, various APIs including those only allowing information to be read and those allowing information to be modified are provided by services.

As described earlier, a method involving issuing a pseudo-request to a service and monitoring an operation of the service by confirming a response to the pseudo-request is disclosed in Japanese Patent Application Laid-open No. 2005-208749. However, performing a pseudo-call such as a pseudo-request in order to monitor an operational state of an AP to an API which modifies information of a service such as data when processing is performed in the service is not favorable because the pseudo-request may cause service information to be modified. Since the method disclosed in Japanese Patent Application Laid-open No. 2005-208749 involves executing Processing along an obtained work flow, no consideration is given to whether or not a request involves modifying information.

Therefore, it is difficult to determine an API suitable for monitoring the operational state of an AP from a plurality of APIs provided to the respective services used by the AP.

An object of the present invention is to select, when monitoring an operational state of an application program, an application programming interface suitable for monitoring the operational state of the application program from a plurality of application programming interfaces provided to services used by the application program.

In order to achieve the object described above, an application operation monitoring apparatus according to an aspect of the present invention is an application operation monitoring apparatus which monitors an operational status of an application program configured to operate by calling an application programming interface provided from a service, the application operation monitoring apparatus including: an extracting unit configured to extract an application programming interface included in a source code of an application program to be monitored; a group specification processing unit configured to specify, based on group information in which a public application programming interface is registered for each of groups in units of the service, a group to which the extracted application programming interface belongs; a selecting unit configured to select, from application programming interfaces belonging to the specified group, an application programming interface which does not involve modifying information when executing a request, as a monitoring application programming interface; a monitoring node creating unit configured to create a monitoring node for determining whether or not the monitoring application programming interface is operating normally by transmitting a pseudo-request to the monitoring application programming interface and receiving a response to the request; and a node registering unit configured to include the monitoring node in the application program.

According to the present invention, when monitoring an operational state of an application program, an application programming interface suitable for monitoring the operational state of the application program can be selected from a plurality of application programming interfaces provided to services used by the application program.

BRIEF DESCRIPTION OF THE DRAWINGS

FIG. 6 shows a configuration example of a node management table shown in FIG. 3;

FIG. 13 shows a configuration example of a node management table shown in FIG. 12.

DETAILED DESCRIPTION OF THE EMBODIMENT

Hereinafter, embodiments of the present invention will be described with reference to the drawings.

First Embodiment

Figure 1:
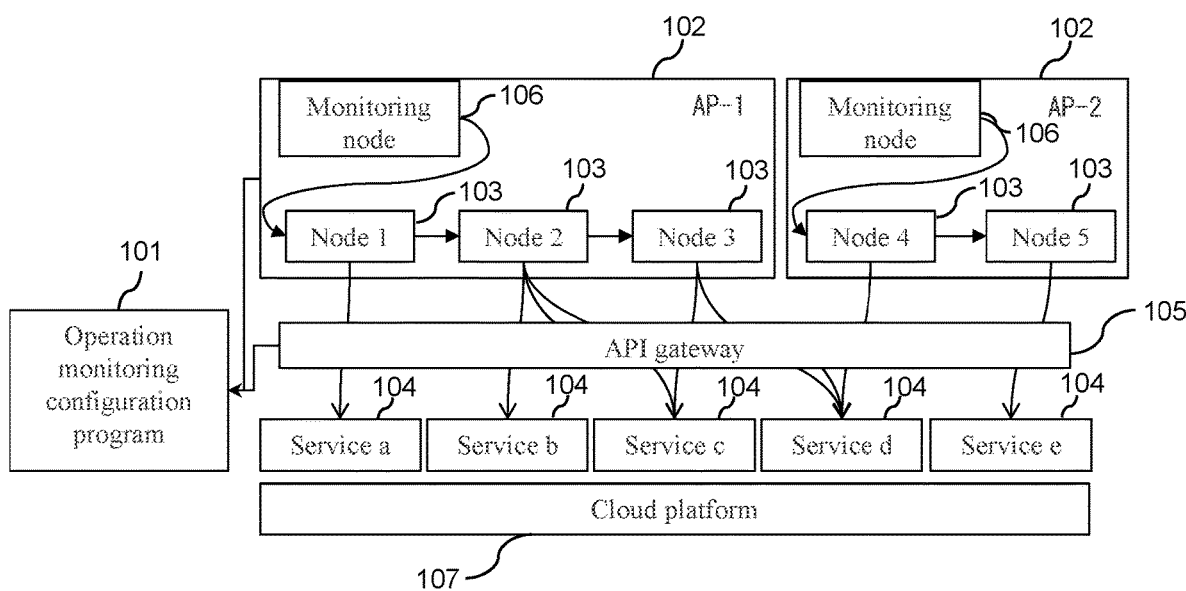
FIG. 1 is a conceptual diagram showing an example of a computer system adopting an application operation monitoring apparatus according to a first embodiment.

FIG. 1 is a conceptual diagram showing an example of a computer system adopting an application operation monitoring apparatus according to a first embodiment.

As shown in FIG. 1, the computer system according to the present example includes an operation monitoring configuration program 101, an application program (AP) 102, a service 104, and an API gateway 105.

The AP 102 includes a plurality of nodes 103 to be functional objects that are modules having default input and output to be used in AP development, and a monitoring node 106 which is a functional object for monitoring. The AP 102 transmits a request to the service 104 and receives a response thereto using an API (to be described later).

Although a server and a network on which each piece of software is executed are not illustrated, the AP 102 and the service 104 may be executed on a same server. When the AP 102 and the service 104 are executed on different servers, a request and a response are transmitted and received via a network.

The service 104 is software which operates outside of an execution environment of an AP and which provides functions and data. An interface by which the service 104 provides other software with functions and data is the API described above. The service 104 is configured to operate on a cloud platform 107 and used by a plurality of APs 102 such as AP-1 and AP-2.

The API gateway 105 is software or a computer executing the software which is interposed as a management apparatus for managing an API between the service 104 as a provider of functions and data and the AP 102 as a user of the functions and data and which manages an API provided by the service 104. Specifically, the API gateway 105 constructs groups in units of the service 104 for a public API, and registers and manages attribute information indicating whether or not an API provided by the service 104 involves modifying information when executing a request as group information for each of the groups.

In addition, the API gateway 105 is equipped with an authentication function for using an API, a function for managing and converting an API to be made public to users when the service is to provide the API separately from an internal API.

Moreover, in FIG. 1, an arrow between the nodes 103 included in the AP 102 represents a data flow in the AP 102, and an arrow from the node 103 to the service 104 indicates that the node 103 calls, via the API gateway 105, an API provided by the service 104.

Figure 2:
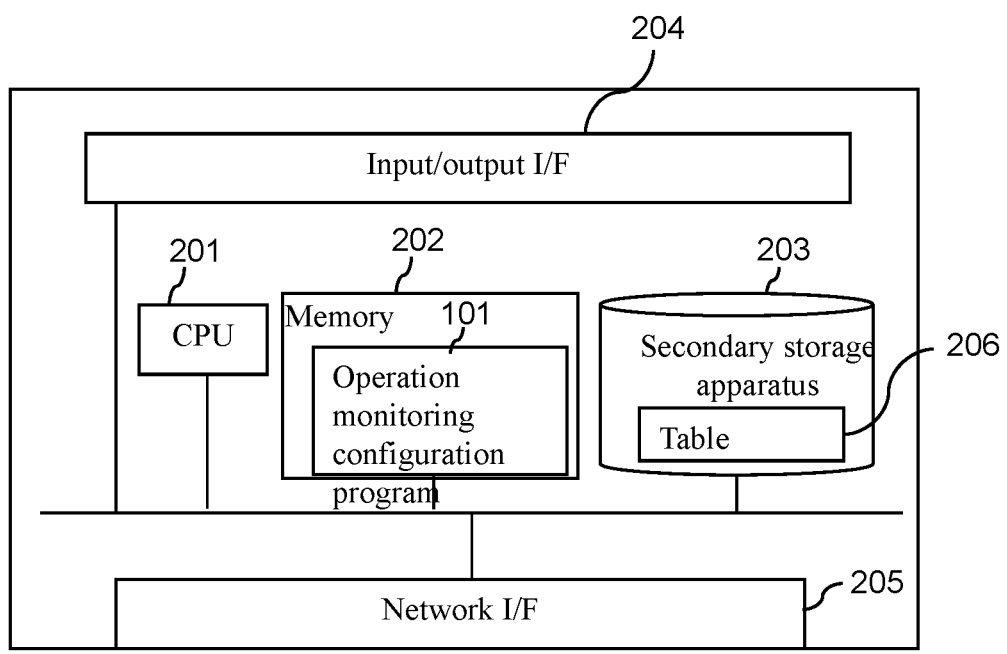
FIG. 2 is a diagram showing an example of a hardware configuration of a server executing an operation monitoring configuration program shown in FIG. 1.

FIG. 2 is a diagram showing an example of a hardware configuration of a server executing the operation monitoring configuration program 101 shown in FIG. 1.

As shown in FIG. 2, hardware according to the present example is constituted by one or more central processing units (CPUs) 201, a memory 202, a secondary storage apparatus 203 such as a hard disk, an input/output interface 204 which controls input from a keyboard and a mouse and controls output information to a display, and a network interface 205 for coupling to a network.

In hardware configured as described above, the operation monitoring configuration program 101 is loaded onto the memory 202 of the server and executed by the CPU 201. In addition, data of a table 206 used by the operation monitoring configuration program 101 is stored in the secondary storage apparatus 203.

Servers executing the AP 102, the service 104, and the API gateway 105 share a similar hardware configuration. Moreover, each server may be implemented as a virtual machine instead of a physical machine.

Figure 3:
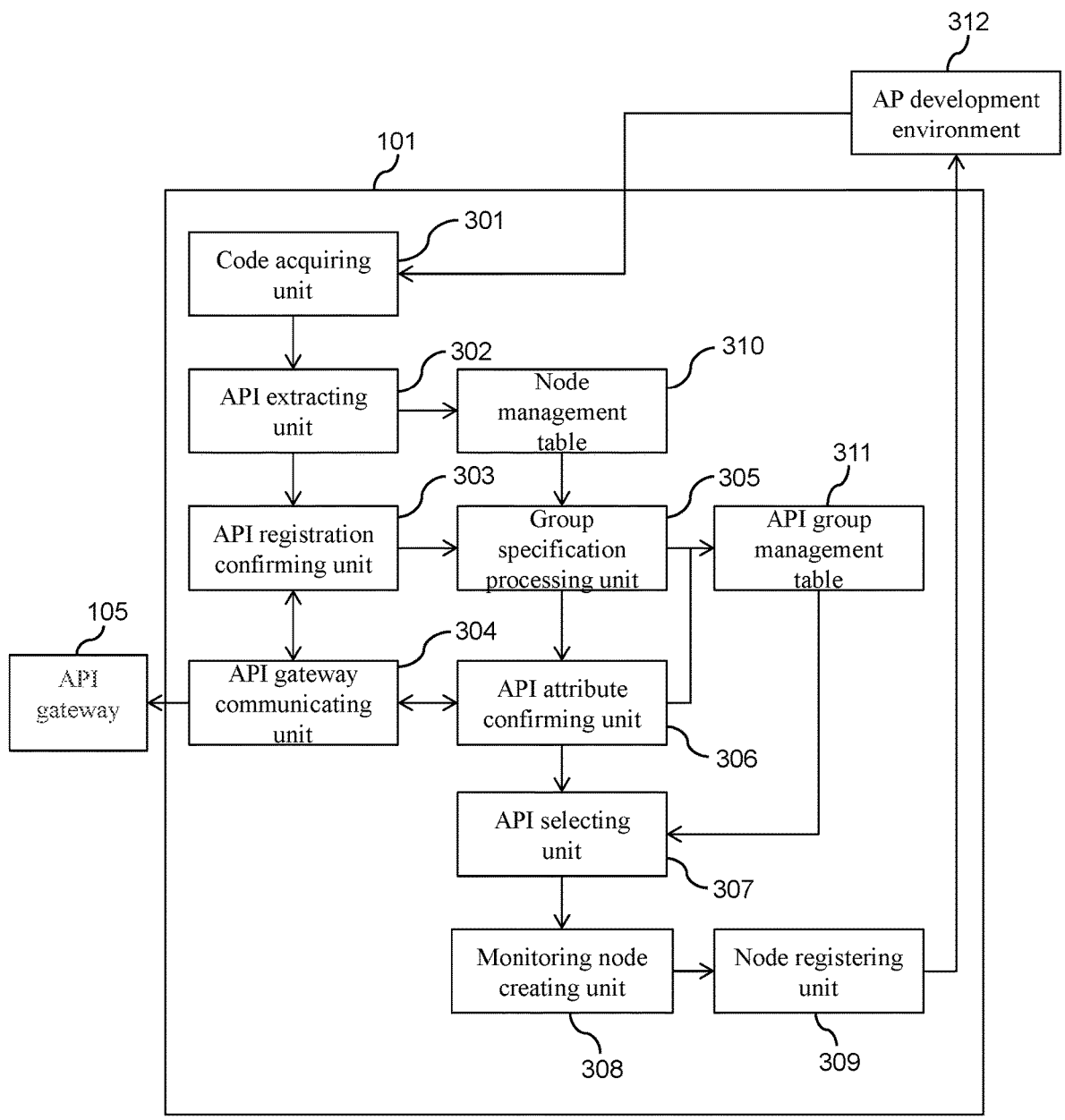
FIG. 3 is a diagram showing an example of a functional module configuration of the operation monitoring configuration program shown in FIG. 1.

FIG. 3 is a diagram showing an example of a functional module configuration of the operation monitoring configuration program 101 shown in FIG. 1.

As shown in FIG. 3, functional modules of the operation monitoring configuration program 101 according to the present example include a code acquiring unit 301, an API extracting unit 302, an API registration confirming unit 303, an API gateway communicating unit 304, a group specification processing unit 305, an API attribute confirming unit 306, an API selecting unit 307, a monitoring node creating unit 308, and a node registering unit 309. The operation monitoring configuration program 101 constitutes a first embodiment of the application operation monitoring apparatus. In addition, as tables to be used by the respective processes, the functional module configuration of the operation monitoring configuration program 101 shown in FIG. 1 includes a node management table 310 and an API group management table 311.

The code acquiring unit 301 acquires a source code of an AP to be monitored from an AP development environment 312.

The API extracting unit 302 analyzes the source code acquired by the code acquiring unit 301 and extracts an API included in the source code.

The API registration confirming unit 303 confirms, via the API gateway communicating unit 304, whether or not the API extracted by the API extracting unit 302 is registered in the API gateway 105. An API is registered in the API gateway 105 and is made public by forming groups in units of the service 104 in order to enable the AP 102 to use the service 104.

The API gateway communicating unit 304 is used to acquire information from the API gateway 105.

The group specification processing unit 305 specifies a group to which the API extracted by the API extracting unit 302 belongs by mapping an API to a group of each service. In doing so, the group specification processing unit 305 may conceivably be configured such that, when the API registration confirming unit 303 confirms that the API extracted by the API extracting unit 302 is registered in group information, the group specification processing unit 305 performs the processing described above.

The API attribute confirming unit 306 confirms attribute information of an API registered in the API gateway 105. As described above, since attribute information indicating whether or not an API provided by the service 104 involves modifying information when executing a request is registered with respect to a public API in the API gateway 105 as group information of each group configured in units of the service 104, the API attribute confirming unit 306 is to confirm the attribute information.

The API selecting unit 307 selects an API which does not involve modifying information when executing a request from APIs belonging to the group specified by the group specification processing unit 305 as a monitoring API which is suitable for monitoring an operational state of an AP.

The monitoring node creating unit 308 creates a monitoring node that is a functional module for monitoring which transmits a pseudo-request to the monitoring API selected by the API selecting unit 307 and receives a response to the request to determine whether or not the monitoring API is operating normally.

The node registering unit 309 causes the monitoring node created by the monitoring node creating unit 308 to be included in an AP by registering the monitoring node in the AP development environment 312.

An operation monitoring method of an AP in a computer system configured as described above will now be described.

Figure 4:
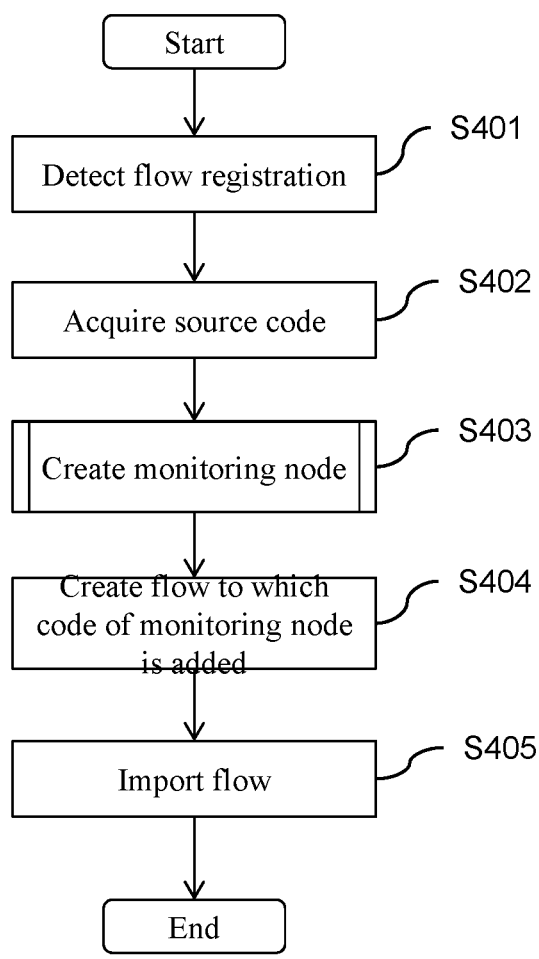
FIG. 4 is a flow chart for describing overall processing of the operation monitoring configuration program shown in FIGS. 1 to 3.

FIG. 4 is a flow chart for describing overall processing of the operation monitoring configuration program 101 shown in FIGS. 1 to 3.

First, an AP developer creates an AP flow using the AP development environment 312, and detects flow registration upon executing registration of the flow (step 401). Examples of detection methods include a method of displaying a button for calling the operation monitoring configuration program 101 on the AP development environment 312 and detecting an operation by the AP developer of pressing the button as well as a method of hooking processing in the AP development environment 312.

Next, with respect to the registered flow, the code acquiring unit 301 acquires a source code by exporting the source code from the AP development environment 312 (step 402).

Next, in the operation monitoring configuration program 101, a monitoring node creation process (to be described later) is performed based on the source code acquired by the code acquiring unit 301 (step 403).

Next, in the operation monitoring configuration program 101, a source code of the created monitoring node is added to the acquired source code of the flow (step 404), and the monitoring node is caused to be included in an AP by importing the flow into the AP development environment 312 (step 405). The AP developer can check the flow to which the monitoring node has been added on a GUI of the AP development environment 312.

Moreover, the AP monitoring node created by the monitoring node creation process in step 403 may be imported into the AP development environment 312. In this case, the AP developer is to perform processing for adding the imported node to the flow of the AP.

Figure 5:
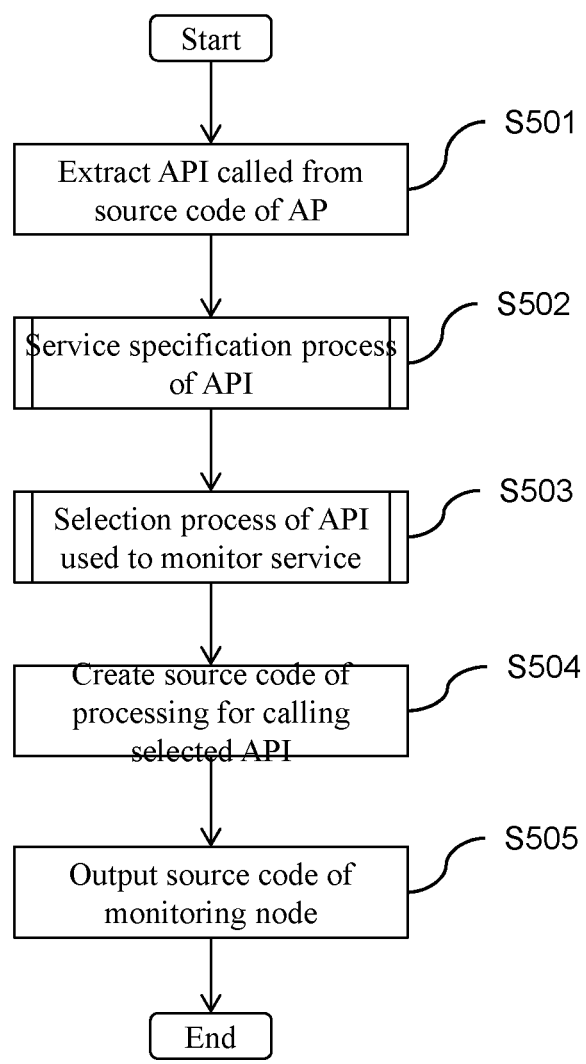
FIG. 5 is a flow chart for describing a monitoring node creation process in the operation monitoring configuration program shown in FIGS. 1 to 3.

FIG. 5 is a flow chart for describing the monitoring node creation process in the operation monitoring configuration program 101 shown in FIGS. 1 to 3 or, in other words, for describing details of the monitoring node creation process in step 403 shown in FIG. 4.

In the monitoring node creation process in the operation monitoring configuration program 101, first, the API extracting unit 302 analyzes the source code of the AP acquired by the code acquiring unit 301 to extract an API called in the AP (step 501) and registers the API in the node management table 310 for each node of the AP.

FIG. 6 shows a configuration example of the node management table 310 shown in FIG. 3.

For example, as shown in FIG. 6, the node management table 310 shown in FIG. 3 is constituted by an AP ID field 801 which identifies the AP 102, a node ID field 802 which identifies the node 103, and an API field 803 which indicates an API being called by the node 103, whereby a node and an API extracted by the API extracting unit 302 are managed in units of the AP 102.

Next, in the operation monitoring configuration program 101, a service specification process is performed for specifying which service the API extracted by the API extracting unit 302 belongs to (step 502), and an API selection process for selecting an API for monitoring for each service group is performed (step 503).

Next, the monitoring node creating unit 308 creates a source code for determining whether or not the API selected in the API selection process is operating normally by transmitting a pseudo-request to the selected API and receiving a response to the request to call the selected API (step 504), and outputs the source code as a monitoring node (step 505).

Figure 7:
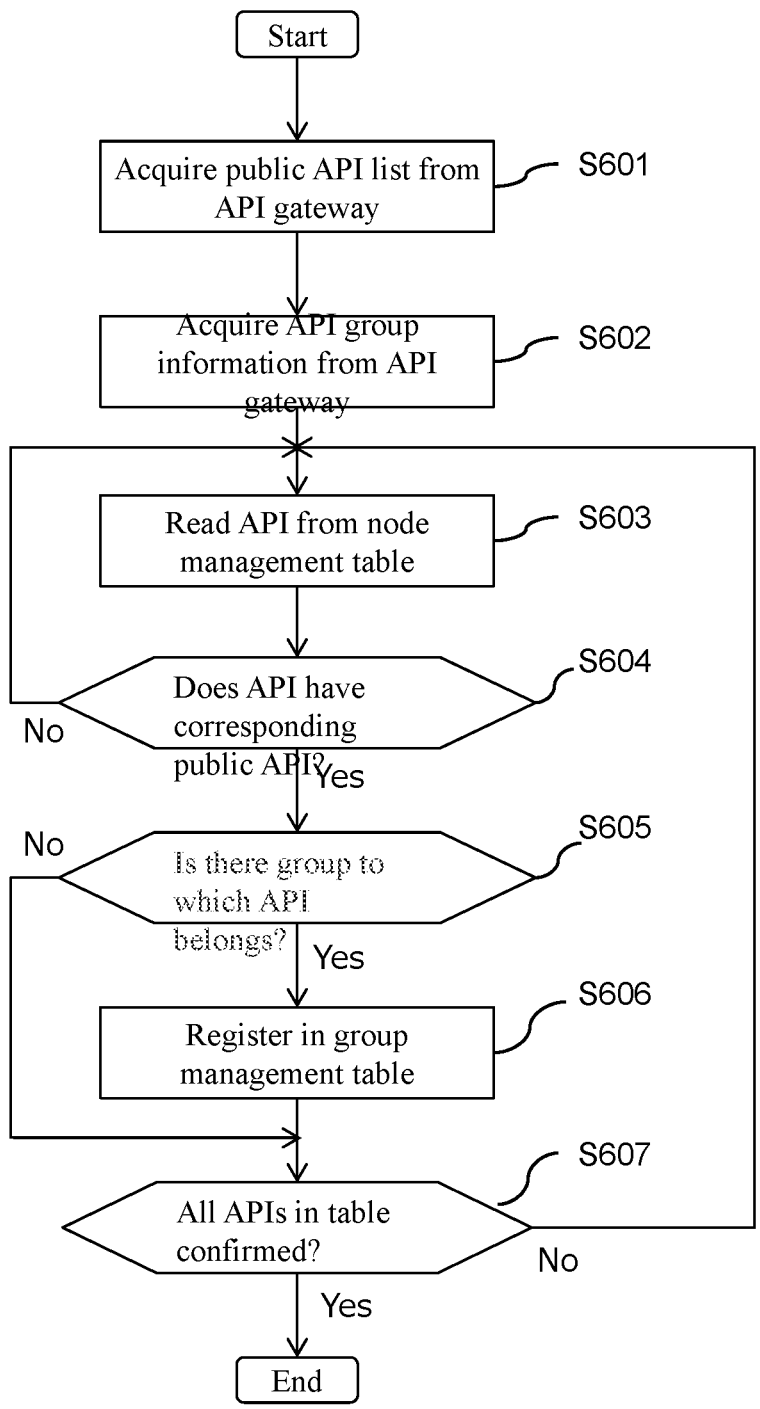
FIG. 7 is a flow chart for describing a service specification process of an API in the operation monitoring configuration program shown in FIGS. 1 to 3.

FIG. 7 is a flow chart for describing the service specification process of an API in the operation monitoring configuration program 101 shown in FIGS. 1 to 3 or, in other words, for describing details of the processing in step 502 shown in FIG. 5.

In the service specification process in the operation monitoring configuration program 101, first, the API gateway communicating unit 304 communicates with the API gateway 105 and acquires a list of public APIs managed by the API gateway 105 (step 601) and, at the same time, acquires API group information managed by the API gateway 105 from the API gateway 105 (step 602). As described earlier, since an API is registered in the API gateway 105 and is made public by forming groups in units of the service 104 in order to enable the AP 102 to use the service 104 and since group information for each group constructed in units of the service 104 is registered with respect to a public API, the API gateway communicating unit 304 can acquire these pieces of information from the API gateway 105.

Next, in the operation monitoring configuration program 101, using the information acquired by the API gateway communicating unit 304, APIs registered in the node management table 310 are sequentially read from the node management table 310 (step 603) and the following processing is performed.

First, with respect to an API read from the node management table 310, the API registration confirming unit 303 confirms whether there is a corresponding public API in the public API list acquired by the API gateway communicating unit 304 from the API gateway 105 (step 604). In doing so, with respect to an API read from the node management table 310, whether there is a corresponding public API is confirmed in a format in which a configuration value portion of a parameter has been removed. When there is no corresponding public API, the API registration confirming unit 303 returns to step 603 and performs a similar confirmation with respect to a next API.

When an API read from the node management table 310 corresponds to a public API, since the read API is an API which calls a service, next, which service the read API belongs to is confirmed based on the API group information acquired in step 602 (step 605).

Subsequently, when there is a group to which the API read from the node management table 310 belongs, the group is registered in the API group management table 311 (step 606).

Once all APIs registered in the node management table 310 called by the AP 102 have been confirmed (Yes in step 607), the present process is ended.

Figure 8:
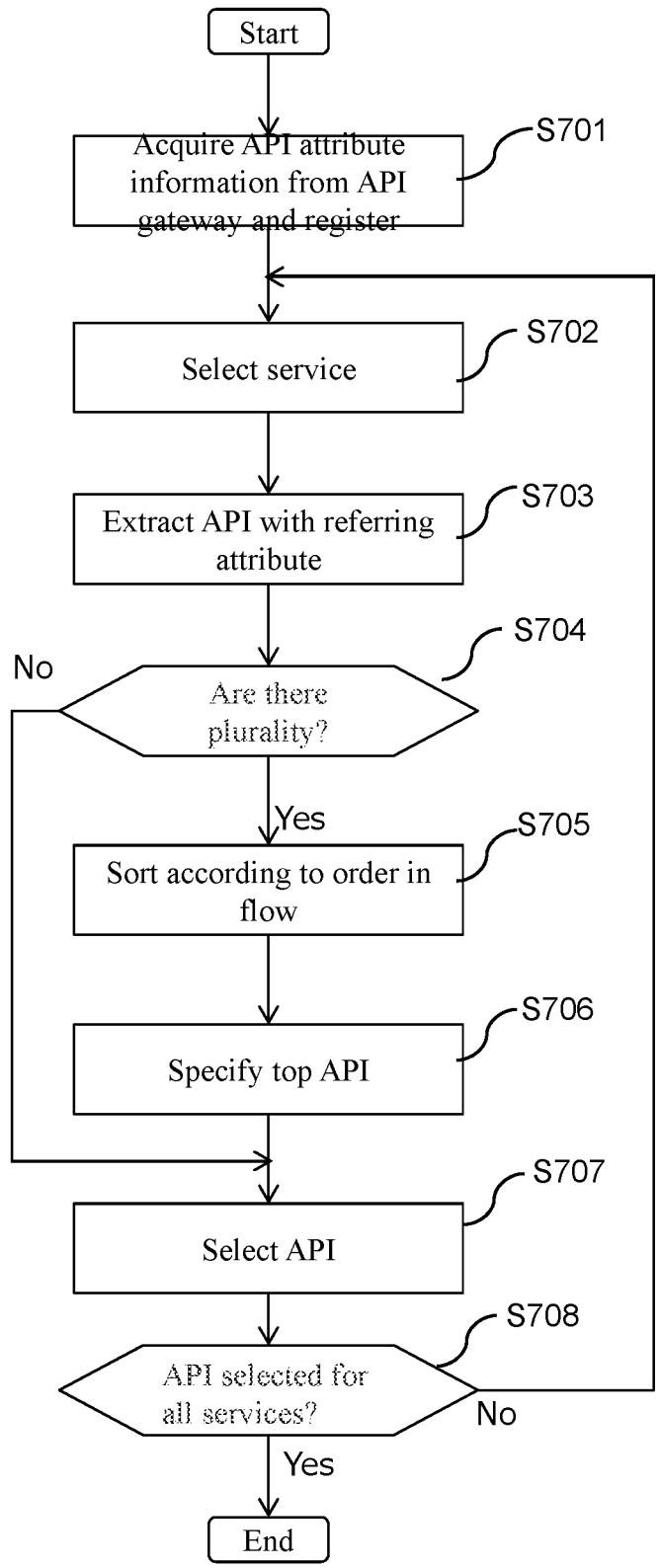
FIG. 8 is a flow chart for describing processing for selecting an API in the operation monitoring configuration program shown in FIGS. 1 to 3.

FIG. 8 is a flow chart for describing processing for selecting an API in the operation monitoring configuration program 101 shown in FIGS. 1 to 3 or, in other words, for describing details of the API selection process in step 503 shown in FIG. 5.

In the API selection process in the operation monitoring configuration program 101, first, the API gateway communicating unit 304 communicates with the API gateway 105 to acquire attribute information of APIs from the API gateway 105 and, for each API registered in the API group management table 311, registers, in the attribute field of the API management table, whether the API is a referring API which refers to information of a service without modifying the information when executing a request or an updating API which involves modifying information when executing the request (step 701).

Figure 9:
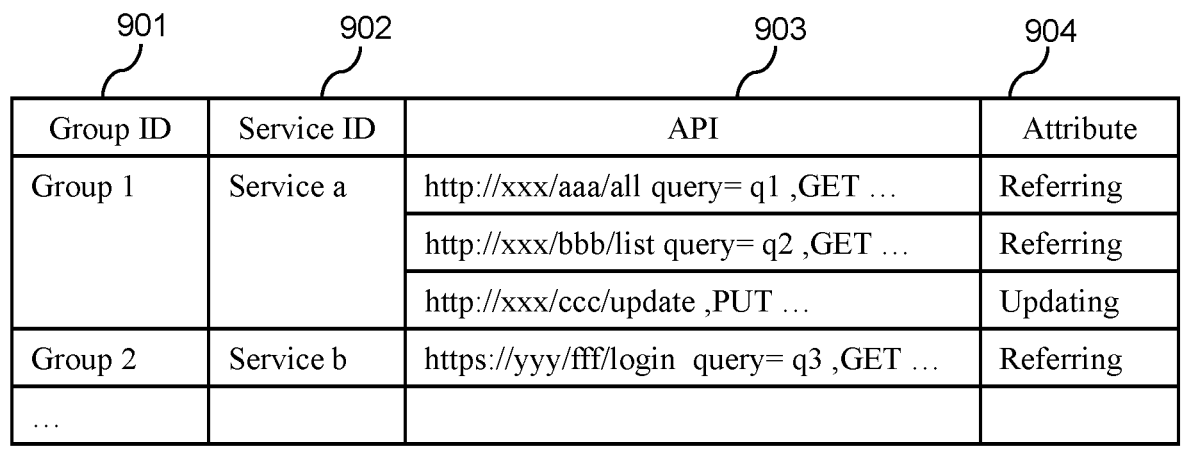
FIG. 9 shows a configuration example of an API group management table shown in FIG. 3.

FIG. 9 shows a configuration example of the API group management table 311 shown in FIG. 3.

For example, as shown in FIG. 8, the API group management table 311 shown in FIG. 3 is constituted by a group ID field 901 which identifies a group, a service ID field 902 which identifies a service corresponding to the group, an API field 903 constituted by an API provided by the service, and an attribute field 904 indicating whether the API is a referring API which refers to information of a service without modifying the information when executing a request or an updating API which involves modifying information when executing the request, and manages APIs in units of the service. As described above, in the operation monitoring configuration program 101, whether an API is a referring API which refers to information of a service or an updating API which involves performing a modification process of information of a service is acquired from the API gateway 105 and configured as an attribute of each API.

Next, the API selecting unit 307 sequentially selects services registered in the API group management table 311 (step 702), and selects an API to be used for monitoring.

In the API selecting unit 307, first, an API with a referring attribute is extracted among APIs included in the service in the API group management table 311 (step 703).

When there are a plurality of extracted referring APIs (Yes in step 704), any one of the APIs is selected. At this point, in the AP, nodes are sorted in accordance with the flow from an upstream of the flow (step 705). An API called by a most upstream node is specified (step 706), and the specified API is determined as a monitoring API (step 707). When there are a plurality of APIs in the node, for example, an API initially extracted by an analysis of an acquired source code is selected. As a method of selecting an API, a method of selecting one API at random may be adopted. The number of APIs is not limited to one, and a plurality of APIs may be selected as long as the APIs satisfy conditions.

In this manner, when there are a plurality of referring APIs, selectins an API called by an upstream node among the nodes included in an AP to be monitored as a monitoring API enables an operational state of an API to be confirmed in an efficient manner during execution of the AP.

When one API is extracted in step 703, the API is determined as a monitoring API (step 707).

Subsequently, when APIs have been selected with respect to all services (step 708), the processing is ended.

As described above, since a group to which an API to be monitored belongs is specified from group information retained by the API gateway 105 and a monitoring API is selected from the group, a monitoring API belonging to the same group as the API to be monitored can be reliably selected. Moreover, when no API with a referring attribute is found in step 703, the AP may conceivably be disregarded as a monitoring target.

Figure 10:
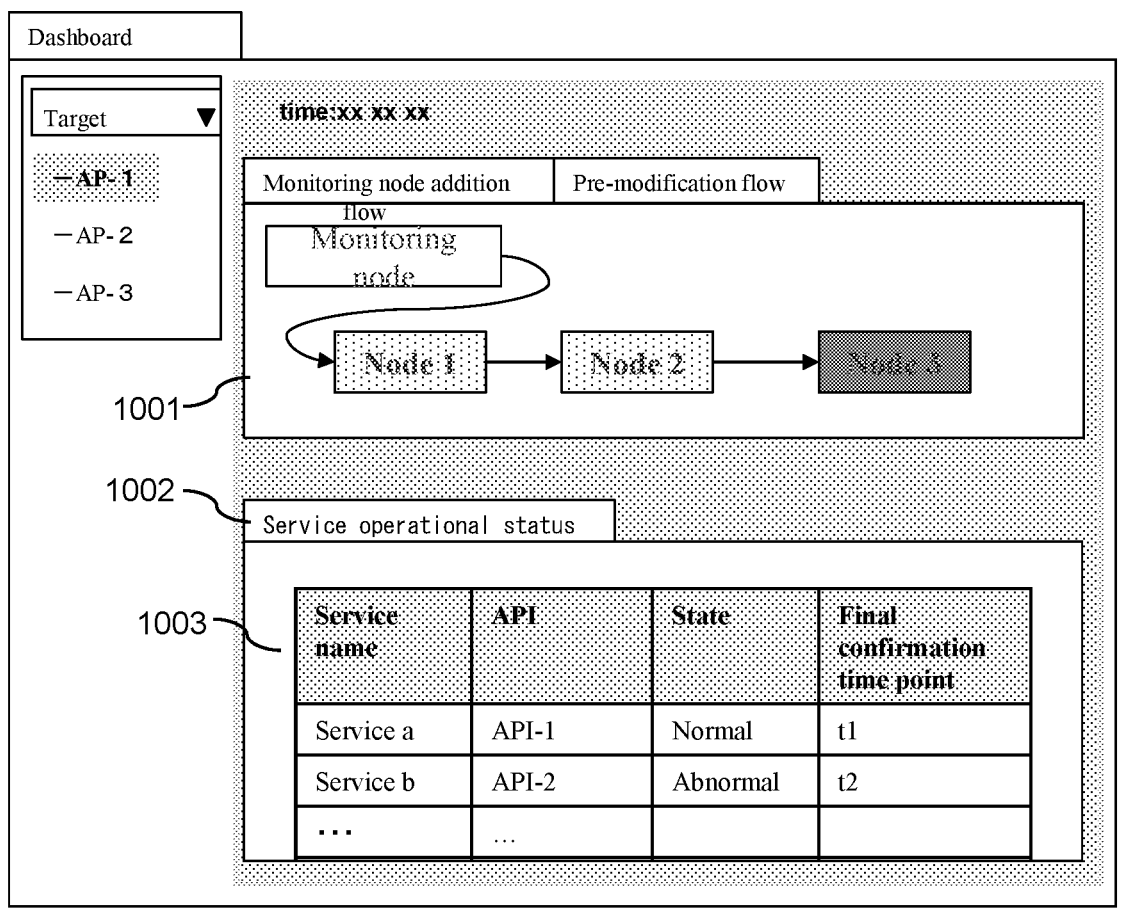
FIG. 10 is a diagram showing a screen example displayed and output by the operation monitoring configuration program shown in FIGS. 1 to 3.

FIG. 10 is a diagram showing a screen example displayed and output by the operation monitoring configuration program 101 shown in FIGS. 1 to 3.

In the operation monitoring configuration program 101 shown in FIGS. 1 to 3, a screen such as that shown in FIG. 10 is displayed and output via the input/output interface 204. An upper half 1001 displays a flow to which is added a monitoring node having imported an output result of the operation monitoring configuration program 101. A comparison can also be made by outputting a pre-modification flow before adding the monitoring node.

A lower half 1002 displays and outputs an operational state of services.

For example, a state and a final confirmation time point of services and APIs are displayed and output in a table format (1003). Moreover, operation monitoring may be executed regularly besides during AP execution. In this case, a final confirmation time point at which monitoring has been executed is displayed and output.

In the embodiment described above, while an attribute indicating whether an API is a referring API or an updating API is acquired from the API gateway 105 and a monitoring API is selected based on the attribute in the operation monitoring configuration program 101, as another method of determining that an API is a referring API in order to select a monitoring API, a determination method is conceivable in which an API is determined a referring API when a type of the API is a GET URL indicating information acquisition and there are no parameters other than the URL or when a type of the API is a GET URL indicating information acquisition and the URL includes "img" indicating that the URL is for image reading. This determination method can be used when group information acquired from the API gateway 105 does not include attribute information indicating whether or not execution of a request involves modifying information. In this manner, by selecting a monitoring API using attribute information when attribute information is obtained from group information managed in the API gateway 105 but selecting a monitoring API based on contents of APIs when attribute information is not obtained from group information, a referring API can be reliably selected as a monitoring API based on the group information and, at the same time, a monitoring API can be selected even when attribute information is not obtained from group information.

Furthermore, as means for selecting a monitoring API, there is a method of using billing information with some APIs, a called service is billed but with other APIs, a called service is not billed. Such API billing information is acquired from an API gateway or, when a separate billing server to the API gateway is present in the system, a billing attribute of an API is acquired in the present program from the API gateway or the billing server. Means for selecting an API from a plurality of APIs may include a method of selecting an API which is not billed from the plurality of APIs.

In addition, when an API extracted from the source code is an updating API, a configuration may conceivably be adopted in which a referring API belonging to a same group is used as a monitoring API. In this case, a monitoring API can be appropriately configured regardless of whether the extracted API is a referring API or an updating API.

As described above, in the present embodiment, among APIs belonging to a same group as an API extracted from a source code of an AP, a referring API which does not involve modifying information when executing a request is selected as a monitoring API, and a normal operation of the API to be monitored is estimated by confirming a normal operation of the monitoring API, whereby an operation of the AP can be confirmed while preventing changes in information from affecting a state of a service.

Moreover, while a case where the operation monitoring configuration program 101 is executed as a program separate from the AP development environment 312 has been shown in the present embodiment, the operation monitoring configuration program 101 may be implemented as a partial module of the AP development environment 312.

In addition, while the present embodiment is to be executed at a timing of flow creation in a development environment, timings of both flow registration and flow update are not limited to when a flow is newly created.

Second Embodiment

Figure 11:
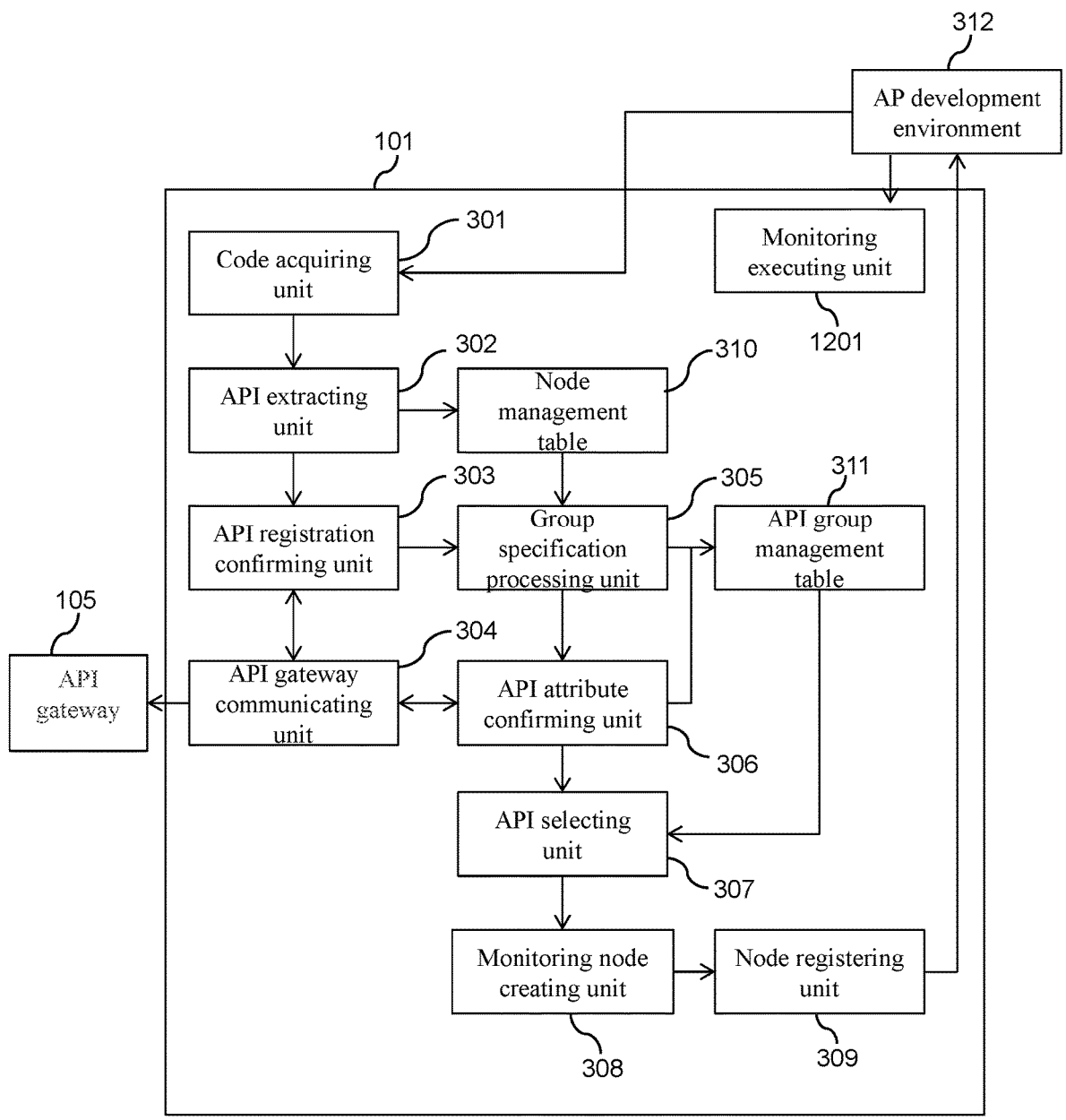
FIG. 11 is a diagram showing another example of a functional module configuration of the operation monitoring configuration program shown in FIG. 1.

FIG. 11 is a diagram showing another example of a functional module configuration of the operation monitoring configuration program 101 shown in FIG. 1.

As shown in FIG. 11, the functional module configuration of the operation monitoring configuration program 101 according to the present example differs from that shown in FIG. 3 in that a monitoring executing unit 1201 is provided.

When the monitoring node 106 included in the AP 102 is executed as described earlier, the monitoring executing unit 1201 determines that, for each node 103 included in the AP, the node 103 is in a normal state when monitoring APIs corresponding to all APIs called by the node 103 are operating normally but determines that the node 103 is in an abnormal state when monitoring APIs corresponding to one or more APIs called by the node is not operating normally. In addition, an AP is made executable when all nodes included in the AP are in a normal state but an AP is placed in execution standby when one or more nodes included in the AP are in an abnormal state.

Figure 12:
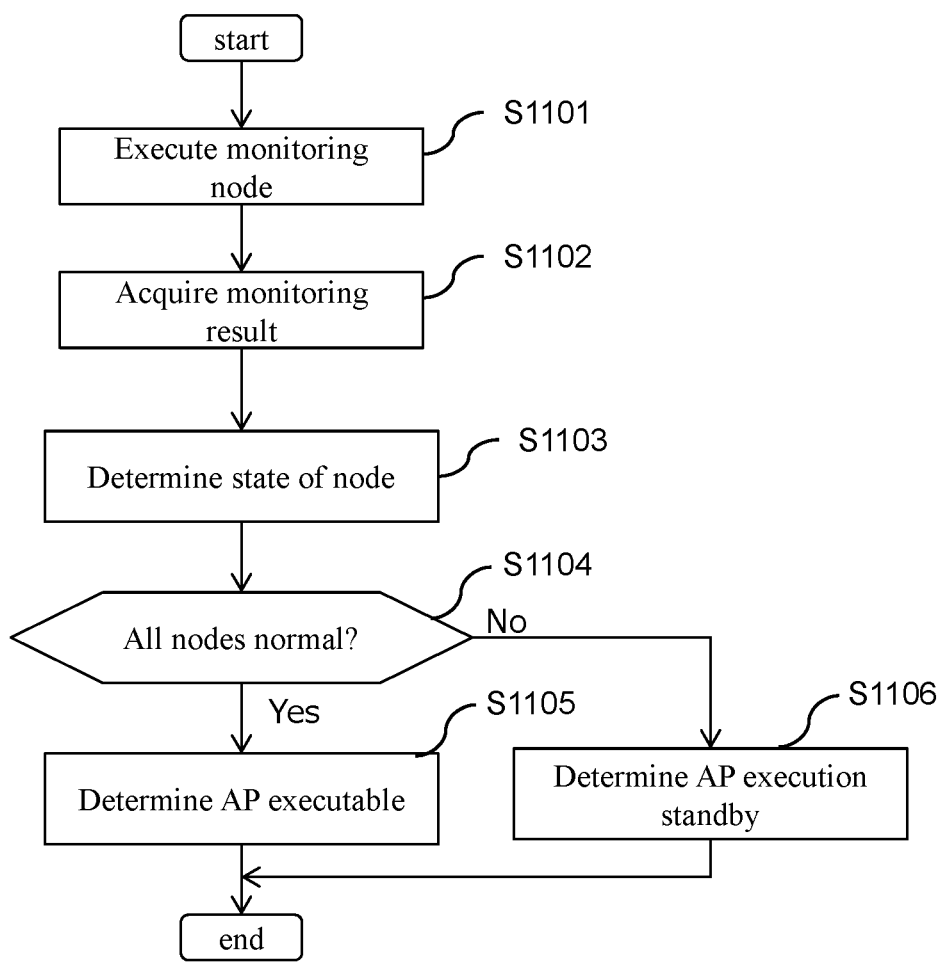
FIG. 12 is a flow chart for describing a monitoring execution process in an operation monitoring configuration program shown in FIG. 11.

FIG. 12 is a flow chart for describing a monitoring execution process in the operation monitoring configuration program 101 shown in FIG. 11. The operation monitoring configuration program 101 shown in FIG. 11 is a program similar to that shown in FIG. 3 and executes a monitoring node included in an AP to perform processing for determining a state of a node of the AP and processing for determining execution standby of the AP.

In the operation monitoring configuration program 101 shown in FIG. 11, in addition to processing for calling an API which is similar to the processing shown in FIG. 3, the monitoring node added to the flow is executed (step 1101). Subsequently, an operational state of each service is registered in a state field of the node management table 310.

FIG. 13 shows a configuration example of the node management table 310 shown in FIG. 12.

As shown in FIG. 13, in addition to an AP ID field 1301 which identifies the AP 102, a node ID field 1302 which identifies the node 103, and an API field 1303 which indicates an API being called by the node 103, the node management table 310 shown in FIG. 12 includes a state field 1304 which indicates a state of the API.

The monitoring executing unit 1201 receives a result of execution of a monitoring API by the monitoring node 106 (step 1102), and determines a state of each node (step 1103). In this case, as a determination method of the monitoring executing unit 1201, a normal node state is determined when all services called by a node are in a normal operational state but an abnormal node state is determined when one or more services is abnormal. Accordingly, an operational state of an API provided by each service can be automatically monitored and, for each functional object included in an AP, whether an operational state of the functional object is normal or abnormal can be assessed.

Next, the monitoring executing unit 1201 determines whether or not all nodes included in a flow of the AP 102 are in a normal state (step 1104). In addition, the present AP is determined to be executable when all nodes are normal (step 1105), but the AP is placed in execution standby when one or more nodes included in the AP are in an abnormal state (step 1106). Accordingly, whether or not the AP is normally executable can be determined based on the state of each node.

In addition, a result of the monitoring execution program described above is notified to an AP deployment control process and control is carried out so that deployment is not performed when a determination of execution standby has been made or a request from a user to an AP is not transmitted when the AP has already been deployed.

Subsequently, the monitoring execution program is regularly executed, and when all nodes are determined to be in a normal state, an AP deployment control unit is notified of a result of the monitoring execution program and control is carried out so as to perform deployment of the AP and make the AP executable.

Moreover, the state determined in the present embodiment may conceivably be visualized for each node by applying color, hatchings, and the like when outputting the node in the upper half of FIG. 10.

As described above, by using an appropriate API to confirm an operational state of services used by an AP and controlling execution of the AP when there is an abnormal service, wasteful retry processes of the AP can be prevented.

While embodiments of the present invention have been described above, embodiments of the present invention are by no means limited to the exemplified embodiments and various modifications may be made without departing from the spirit of the invention.

What is claimed is:
1. An application operation monitoring apparatus which monitors an operational status of an application program configured to operate by calling an application programming interface provided from a service, the application operation monitoring apparatus comprising:

a memory;

an input/output device; and a CPU communicatively coupled to the memory and the input/output device, the processor configured to:

extract an application programming interface included in a source code of an application program to be monitored, acquire a plurality of public application programming interfaces managed by an application programming interface gateway and acquire application programming interface group information for each of the plurality of acquired public application programming interfaces, determine if the extracted application programming interface has a corresponding public application programming interface from the plurality of acquired public application programming interfaces, confirm, the service the extracted application programming interface belongs to, is based on the acquired application programming interface group information, register, based on the confirmed service, the extracted application programming interface corresponding group, select, from a plurality of application programming interfaces belonging to the registered group, an application programming interface which does not involve modifying information when executing a request, as a monitoring application programming interface, create a monitoring node for determining whether or not the monitoring application programming interface is operating normally by transmitting a pseudo-request to the monitoring application programming interface and receiving a response to the request, and include the monitoring node in the application program, and wherein when selecting the monitoring application programming interface, the processor is further configured to:

extract from the plurality of application programming interfaces belonging to the registered group, at least one of the plurality of application programming interfaces that has a predetermined attribute, sort each node that is a functional object based on a flow, and select, as the monitoring application programming interface, an application programming interface from an upstream-side node based on the flow.

2. The application operation monitoring apparatus according to claim 1, wherein the processor is further configured to acquire the application programming interface group information from a management apparatus which manages a public application programming interface and to confirm that the extracted application programming interface is registered in the application programming interface group information, wherein when the extracted application programming interface is confirmed to be registered in the application programming interface group information, perform processing on the extracted application programming interface.

3. The application operation monitoring apparatus according to claim 1, wherein the processor is further configured to:

when attribute information indicating whether or not execution of a request involves modifying information is obtained from the application programming interface group information with respect to an application programming interface belonging to the registered group, select the monitoring application programming interface based on the attribute information from the plurality of application programming interfaces belonging to the registered group; and when attribute information indicating whether or not execution of a request involves modifying information is not obtained from the application programming interface group information with respect to an application programming interface belonging to the registered group, select, from the plurality of application programming interfaces belonging to the registered group, an application programming interface, the type of which is information acquisition and which does not include parameters other than an address, or an application programming interface, the type of which is information acquisition and which is used for image reading, as the monitoring application programming interface.

4. The application operation monitoring apparatus according to claim 1, wherein the processor is further configured to:

when the extracted application programming interface does not involve modifying information when executing a request, select the extracted application programming interface as the monitoring application programming interface; and when the extracted application programming interface involves modifying information when executing a request, select, from the plurality of application programming interfaces belonging to the registered group, an application programming interface which does not involve modifying information when executing a request, as the monitoring application programming interface.

5. The application operation monitoring apparatus according to claim 1, wherein the processor is further configured to:

when an application programming interface which does not involve modifying information when executing a request exists in plurality, select, as the monitoring application programming interface, the application programming interface called by the upstream-side node among nodes that are functional objects included in the application program to be monitored.

6. The application operation monitoring apparatus according to claim 5, wherein the processor is further configured to make the application program executable when all nodes included in the application program are in a normal state, and place the application program in execution standby when one or more nodes included in the application program are in an abnormal state.

7. The application operation monitoring apparatus according to claim 1, the processor further configured to, when the monitoring node is executed, determine, for each node that is a functional object included in the application program: that the node is in a normal state when a monitoring application programming interface corresponding to all application programming interfaces called by the node is operating normally; and that the node is in an abnormal state when a monitoring application programming interface corresponding to one or more application programming interfaces called by the node is not operating normally.

8. An application operation monitoring method of monitoring an operational status of an application program which operates by calling an application programming interface provided from a service, the application operation monitoring method comprising:

extracting, via a processor, an application programming interface included in a source code of an application program to be monitored;

acquiring, via the processor, a plurality of public application programming interfaces managed by an application programming interface gateway and acquire application programming interface group information for each of the plurality of acquired public application programming interfaces;

determining, via the processor, if the extracted application programming interface has a corresponding public application programming interface from the plurality of acquired public application programming interfaces;

confirming, via the processor, the service the extracted application programming interface belongs to, is based on the acquired application programming interface group information stored in a memory;

register, via the processor, based on the confirmed service, the extracted application programming interface corresponding group;

selecting, via the processor, from application programming interfaces belonging to the specified group, an application programming interface which does not involve modifying information when executing a request, as a monitoring application programming interface;

creating, via the processor, a monitoring node for determining whether or not the monitoring application programming interface is operating normally by transmitting a pseudo-request to the monitoring application programming interface and receiving a response to the request; and including, via the memory, the monitoring node in the application program, and wherein when selecting the monitoring application programming interface, the processor is further configured to:

extract from the plurality of application programming interfaces belonging to the registered group, at least one of the plurality of application programming interfaces that has a predetermined attribute, sort each node that is a functional object based on a flow, and select, as the monitoring application programming interface, an application programming interface from an upstream-side node based on the flow.

\* \* \* \* \*